UNITED STATES PATENT OFFICE.

LEOPOLD EDMUND HANCZEWSKI, OF KREUZBURG, GERMANY, ASSIGNOR TO STANLEY HANCZEWSKI, OF CHICAGO, ILLINOIS.

COMPOUND FOR PROTECTING PLANTED SEED-GRAINS.

1,081,445.

Specification of Letters Patent.

Patented Dec. 16, 1913.

No Drawing.

Application filed August 26, 1913. Serial No. 786,703.

*To all whom it may concern:*

Be it known that I, LEOPOLD EDMUND HANCZEWSKI, a subject of the German Empire, resident of Kreuzburg, Upper Silesia, Germany, have invented certain new and useful Improvements in Compounds for Protecting Planted Seed-Grains, of which the following is a full, clear, and exact specification.

This invention relates to improvements in compounds for protecting planted seed grains, such for example as corn, barley, wheat, oats, beet sugar, and other grains, which, after being planted are liable to destruction or injury from birds, animals, insects and worms, or from mildew, or decay from an over moist earth.

The object of my invention is a compound containing various materials, some of which are so repulsive to animals, others to birds, some to insects and worms, either from their odor or by the taste, as to repel seed coated with my compound from their attack, which compound also contains other materials, some of which repel moisture, otherwise producing mildew or decay of the seed, while at the same time other materials furnish a food to the grain promoting their sprouting and adding strength to the plant growing therefrom. In short the object of my invention is a coating compound for seed grains of various kinds, which on being applied to the grains before planting will render them immune to the attack and destruction by birds, animals, insects and worms, to mildew and decay, and which also furnishes a food to the grain stimulating and correspondingly promoting the sprouting thereof, and subsequent growth.

In carrying out my invention my compound is formed of the materials, and substantially in proportions as follows:

| | |
|---|---|
| Wood tar | 4 pounds. |
| Animal oil | 6 " |
| Sulfate of copper | 4 " |
| Coal tar | 20 " |
| Aqua ammonia | 8 " |
| Phosphate of lime | 2 " |
| Nitrate of potash | 9 ounces. |

Both the coal tar and aqua ammonia may be crude as they come from the gas works, and I may also use crude phosphate of lime and nitrate of potash, for in their crude state they are not only cheaper, but produce the desired results.

My compound is formed by first mixing the coal tar with the aqua ammonia, and stirring thoroughly until mixed, then adding the sulfate of copper and after thoroughly mixing the same with the coal tar and ammonia water, the nitrate of potash and phosphate of lime are added, and likewise mixed, and finally the animal oil and wood tar, and for the purposes of so mixing the several ingredients there may be used any old and well known mixing machine capable of producing a thorough mixture of the several materials, and preferably in the order above named, the sulfated copper being preferably very finely pulverized before its introduction into the mixture.

The wood tar, aqua ammonia, phosphate of lime, and nitrate of potash furnish the seed with a food promoting their sprouting, and subsequent growth. Animal oil has an odor so repulsive to animals, birds and insects as to prevent them feeding on the seed in the presence of its odor, and the sulfate of copper is destructive of worms and insects, and when of such small percentage in the compound as above indicated, at the same time non-injurious to the seed. The coal tar forming as it does, a part of the coating of the seed, as hereinafter described, preserves the seed against mildew and decay, and the wood tar performs the same function, though perhaps to a less degree.

In applying the compound to the various seed grains, the grain is poured into a heap for seasoning, after which it is moistened by a continual mixing with warm water, five and one-fourth quarts for each 220 pounds of the grain, but for beet sugar seed ten and one-half quarts, in any suitable mixing apparatus, and after being so mixed I then at once add a proper amount of the above described compound, previously well stirred, but which in cool air is slightly warmed up, and keep stirring and mixing the seed and compound slowly until each grain becomes brown, whereupon the coated grain is spread in shallow piles, and allowed to lie for a couple of hours, and then once more stirred that the bottom grain may be aired, whereupon the grain after being left a sufficient time for drying out is then ready for planting.

In practice I find that it is best to use two pounds of the compound for coating 300 pounds of wheat, barley and corn, two pounds of the compound for coating 200 pounds of oats, and two and two-fifths pounds of the compound for sufficiently coating 200 pounds of beet sugar seed.

In conclusion it should be stated that while it is preferable to employ wood tar and nitrate of potash in about the proportions before specified for obtaining the very best results, it would be no substantial departure from my formula to omit wood tar and nitrate of potash from the compound, for in practice I find that very and substantially good results are obtained when they are so omitted.

Numerous practical tests made in the United States and Germany, and other European countries demonstrate that seed coated with my compound, as above described, will after being planted in the usual way, either by hand or by machinery, not only be immune to destruction by animals, birds, insects and worms, but also to mildew and rotting, but that their sprouting and growth is quickened, and the resulting plant rendered substantially stronger than the same seed planted in the same soil at the same time, when not coated with my compound. As for example, it has been repeatedly demonstrated that seed corn coated with the above compound of my invention planted side by side in the same soil and at the same time, will produce a substantially larger number of sprouts than the uncoated seed, and that it will have reached a height of five feet within the same time that the uncoated seed has reached a height of three feet, and furthermore that the plants from the coated seed are much more vigorous and stronger.

Having described my invention, what I claim and desire to secure by Letters Patent is:

The herein described seed coating compound, consisting of materials in proportions substantially as follows:

| | |
|---|---|
| Wood tar | 4 pounds. |
| Animal oil | 6 " |
| Sulfate of copper | 4 " |
| Coal tar | 20 " |
| Aqua ammonia | 8 " |
| Phosphate of lime | 2 " |
| Nitrate of potash | 9 ounces. |

In witness whereof I have hereunto set my hand and affixed my seal, this 9th day of August A. D. 1913.

LEOPOLD EDMUND HANCZEWSKI. [L. S.]

Witnesses:
 ERNST KATZ,
 MARTHA KIENAST.